United States Patent Office 2,945,225
Patented July 12, 1960

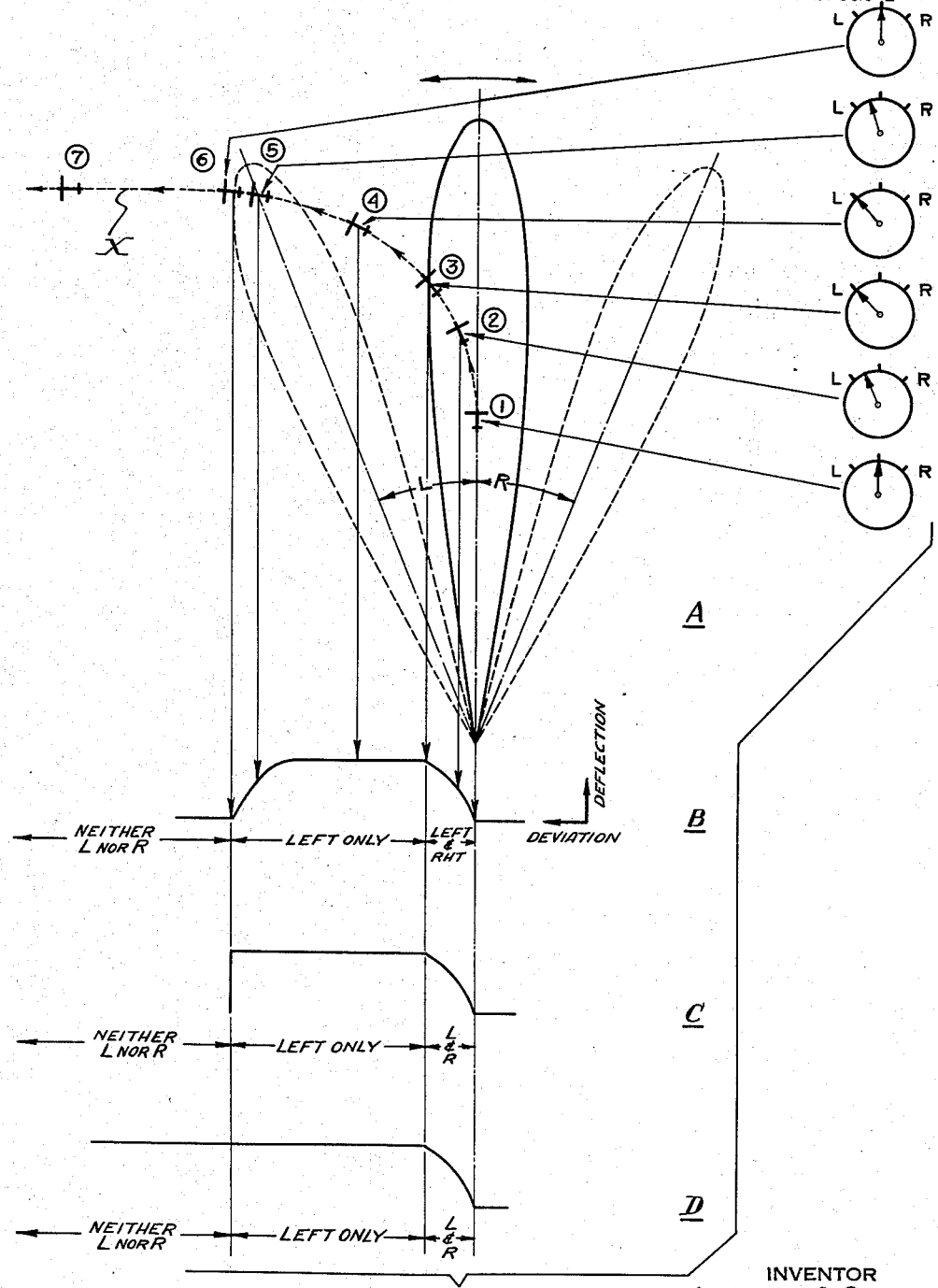

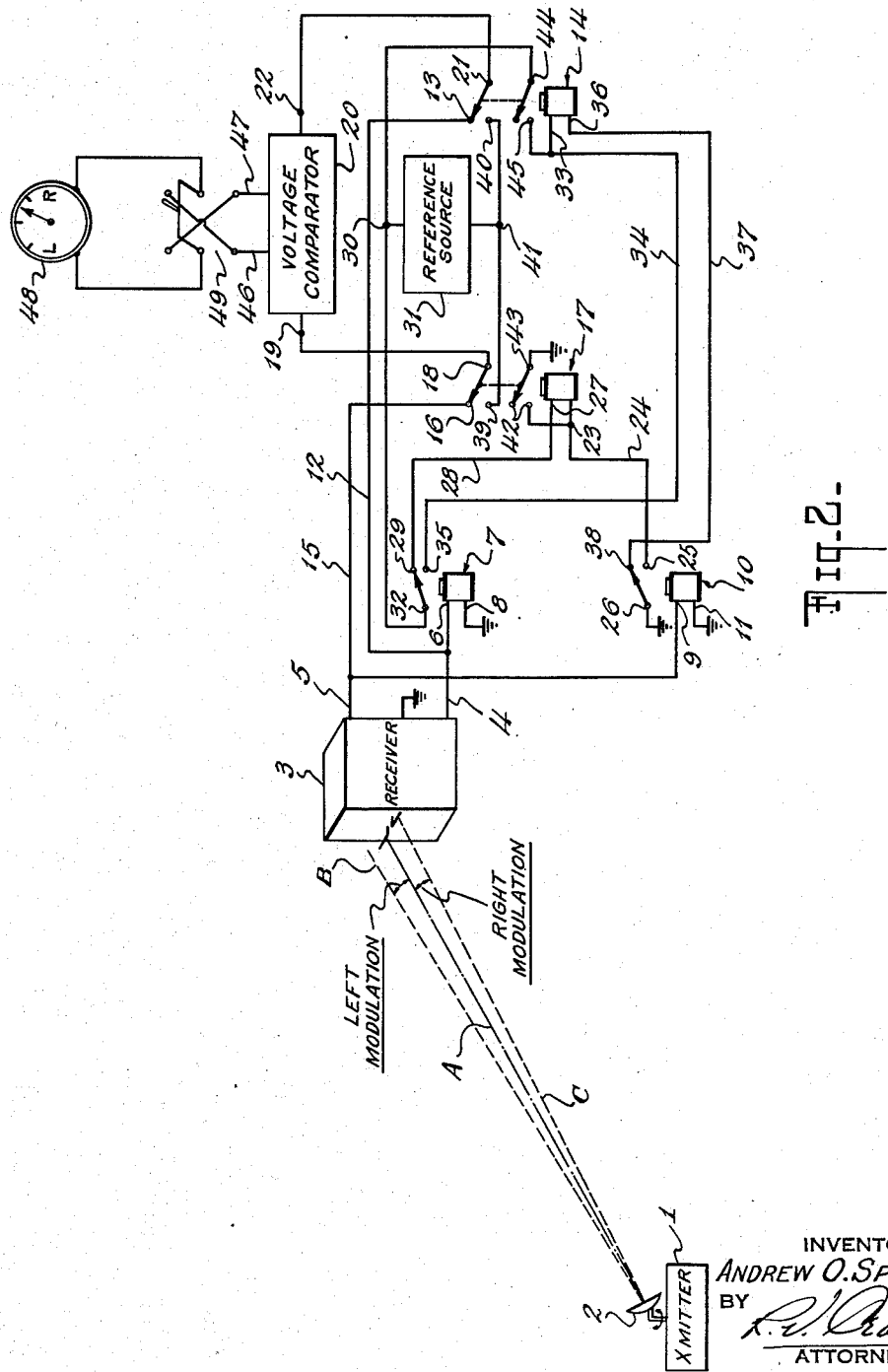

2,945,225

APPARATUS FOR RADIO BEAM GUIDANCE OF A MOBILE CRAFT

Andrew O. Sperber, Glendale, N.Y., assignor to Sperry Rand Corporation, a corporation of Delaware Filed June 15, 1956, Ser. No. 593,010

13 Claims. (Cl. 343—107)

The present invention relates to an improved apparatus for radio beam guidance of a mobile craft and more particularly to means carried aboard a mobile craft to enable the pilot to guide it along a predetermined path in accordance with unambiguous information presented on a visual indicator.

Many systems are known in the art for producing a guidance path in space defined, for example, by distinctively modulated electromagnetic beams which overlap along the guidance path. A receiver, carried on board a mobile craft, and separately responsive to each of the beam modulations may produce output voltages for application to a differential visual indicator in a known manner whereby deflection of the indicator is proportional to the received strength of the modulated beams. When, for example, the craft is guided precisely along the predetermined path, a null reading will be presented by the indicator. As the craft deviates from the path, and correspondingly, from the modulated beams, one or the other of the demodulated signals will decrease in amplitude depending on the sense of craft deviation from the desired flight path. Thus, proportional information will at first be displayed so long as some amount of modulation is detected from each of the two beams.

Assuming that the craft increasingly departs from the guidance path, the previously decreasing one of the demodulated signals will ultimately fall beneath a minimum threshold of detectability and apparently disappear. At this point, a maximum indication will be shown on the indicator. Upon further excursion of the craft away from the path, the remaining one of the demodulated signals will also begin to decrease in amplitude producing a reversed sense of motion of the indicator with decreasing deflection being shown while the actual craft deviation from the path continues to increase. Should the craft deviate still farther, the remaining demodulated signal will likewise disappear at which time the deviation indicator will show an ambiguous null indication precisely as though the craft were at that time moving along the desired path.

A principal object of the present invention, in radio beam guidance systems of the character described above, is to eliminate the erroneous deviation indications produced in the prior art by the movement of a mobile craft from within to without the guidance beam and away from the prescribed path.

A more specific object is to eliminate the reversed sense of motion of the deviation indicator when one of the two demodulated signals has disappeared and the remaining one begins to decrease as a result of said movement of the mobile craft.

Another object is to eliminate the ambiguous null indication produced in the prior art systems when the mobile craft, which was first within the guidance beams defining the path, deviates from the path to such an extent that it no longer receives any guidance signal.

Additional objects and features of the invention will become apparent upon a full understanding of the invention as discussed in the following description with the aid of the enclosed drawings.

Briefly, the foregoing objects are attained by the present invention in the following manner.

A receiver carried on board the guided craft separately demodulates each of the distinctively modulated overlapping guidance beams to produce, in a known manner, a pair of signal voltages each having an amplitude respectively proportional to the received intensity of a corresponding modulated beam. A source of reference voltage is provided that preferably has an amplitude at least equal to the anticipated maximum received amplitude of the signal voltages. Other reference voltage amplitudes may be employed but it is desirable, in the embodiment of the invention disclosed herein, that the reference voltage amplitude be at least equal to the anticipated maximum signal amplitude. The signal voltages and the reference voltage are coupled to switching means which selectively apply, depending on the presence or absence of each of the signal voltages, a pair of voltages comprising an appropriate two of the signal and reference voltages to a differential indicator.

In the event that both signal voltages are present, the switching means couples these directly to the differential indicator. In the event that either one of the signal voltages decreases beneath a minimum detection threshold, the switching means substitutes the reference voltage for the remaining signal voltage and couples the substituted reference voltage to the differential indicator. If the other signal voltage is lost, the reference voltage is substituted, in like manner, for the signal voltage remaining in that case. Should one signal voltage disappear and the remaining one subsequently also vanish, then the switching means will maintain the application of that reference voltage to the differential indicator which was applied prior to the loss of the last remaining signal voltage.

Thus, when both signal voltages are present, the differential indicator is deflected in a sense and magnitude proportional to the algebraic difference in amplitude between the signal voltages. At the instant of loss of either signal voltage as the craft deviates from the prescribed path, the reference voltage is substituted for the remaining signal voltage to maintain the deflection of the differential indicator. When the remaining signal voltage subsequently vanishes because of further excursion of the craft from the prescribed path, the switching means continuously maintains the application of the reference voltage to the indicator last obtaining prior to the loss of the remaining signal voltage.

Fig. 1 shows representative transmitted beam patterns for establishing a guidance path in space and the resulting demodulated voltage amplitudes produced in a remote receiver located at various positions within and without the areas illuminated by the beams.

Fig. 2 is a schematic diagram of a representative embodiment of the present invention.

Fig. 1A shows a representative beam pattern produced in space by a transmitting antenna which is caused to oscillate about a predetermined line, for example, a predetermined azimuth. As the center of the directional beam is displaced to the left of the desired azimuth, a first modulation is placed on the transmitted carrier. Correspondingly, a second modulation is produced when the directional beam deviates to the right of the desired azimuth. The dotted beam patterns of Fig. 1A illustrate the maximum left and right excursions of the directional beam about the guidance path. The line X, intersecting the beam patterns, represents a possible path which a mobile receiver, for example, one carried aboard an aircraft, might follow in traversing the transmitted beams.

Fig. 1B represents the deviation characteristic of a differential indicator responsive to the output of a conventional receiver as previously described. When the aircraft-borne receiver is located at point 1 along line X, equal amplitude demodulated signal voltages produce a null deflection on the differential indicator as shown in Figs. 1A and 1B. Assuming that the receiver progresses from point 1 to point 2 along line X, the intensity of the "right" beam will diminish so that the demodulated signal proportional to the right beam will decrease producing the increasing left deflection of the differential indicator as shown in Figs. 1A and 1B. As the receiver further departs from the flight path by leaving point 2 and moving toward point 3 along line X, the demodulated signal voltage proportional to the right beam intensity vanishes because the modulated right beam no longer is received above the minimum detection threshold as represented figuratively by the solid line beam pattern, and a maximum indication is produced which continues at and beyond point 4 along line X. When the receiver is at point 5, however, it is no longer irradiated by the entire oscillating beam and the remaining left demodulated signal begins to decrease in amplitude resulting in the decreasing deflection shown in Figs. 1A and 1B and, thereby, a reversed sense of motion. At point 6, the receiver is just beyond the point of minimum detectable signal so that neither signal is received and the deviation indication reverts to an ambiguous null.

A more desirable deflection characteristic, and one which a first embodiment of the present invention produces, is shown in Fig. 1C. Fig. 1C displays a characteristic precisely the same as that shown in 1B except that the left maximum deflection of the differential indicator is preserved beyond point 4 until point 6 is reached, whereupon the differential indictor returns to its null position.

Further improvement of the deflection characteristic, over that shown on Fig. 1C, which is produced by a second embodiment of the present invention is shown in Fig. 1D. It will be observed in Fig. 1C that the maximum left deflection of the differential indicator suddenly reverts to zero when point 6 is reached. Such movement of the differential indicator is the result of the loss of the left beam as the receiver progresses beyond point 6 toward point 7 along line X. In Fig. 1D, however, the maximum left deflection of the differential indicator is preserved indefinitely as the receiver continues its departure from the guidance path beyond point 6.

The radio beam guidance system shown in Fig. 2 produces the differential indicator deflection characteristic of Fig. 1D. Transmitter 1 produces a carrier signal, radiated by azimuthally oscillating antenna 2, which carrier is distinctively modulated as the axis of antenna 2 successively crosses a central azimuth position as defined by line A. Lines B and C, respectively, represent the maximum "left" and "right" azimuth excursions of the beam radiated by antenna 2. Thus, the radiated carrier is modulated with "left" information within the angle formed by intersecting lines B and A while said carrier is modulated with "right" information within the angle formed by intersecting lines A and C. Basically, the function of transmitter 1 and azimuthally oscillating antenna 2 is to create modulated beams in space which overlap about line A. It is understood, of course, that a similar result can be accomplished by utilizing two transmitters with individual stationary directional antennae which produce a distinctively modulated pair of beams in space overlapping about line A.

Conventional receiver 3 separately demodulates the left and right beam signals and produces a pair of output signal voltages, appearing on conductors 4 and 5, which signals have respective amplitudes proportional to the strength of the received left and right radiated beams. The left signal voltage appearing on conductor 4 is applied to control terminal 6 of relay 7, whose second control terminal 8 is connected to ground. The right signal voltage appearing on conductor 5 is connected to control terminal 9 of relay 10 whose second control terminal 11 is connected to ground. Relays 7 and 10 are, therefore, respectively energized upon the presence of left and right signal voltages. The left signal voltage is also coupled via conductor 12 to contact 13 of a relay 14 while the right signal voltage is coupled via conductor 15 to contact 16 of a relay 17. In the de-energized condition of relays 17 and 14, as shown, the right signal voltage is applied via closed contacts 16 and 18 of relay 17 to input terminal 19 of voltage comparator 20 while the left signal voltage is coupled via closed contacts 13 and 21 of relay 14 to terminal 22 of voltage comparator 20. Voltage comparator 20 produces an output voltage acting between conductors 46 and 47 for application to indicator 48, having an amplitude and polarity proportional to the algebraic difference in amplitude between the voltages appearing on conductors 19 and 22.

Relay 17 is energized upon the concurrent presence of the right signal and the absence of the left signal in the following manner. Control terminal 23 of relay 17 is connected via conductor 24 to contact 25 of relay 10. When relay 10 is energized by the presence of the right signal, contact 25 is connected to ground via closed contacts 25 and 26. Control terminal 27 of relay 17 is connected via conductor 28 to contact 29 of relay 7. When relay 7 is de-energized, upon the absence of left signals, contact 29 is connected to terminal 30 of reference source 31 via closed contacts 29 and 32. The potential on terminal 30 of reference source 31 is of an amplitude at least sufficient, with respect to ground, to energize relay 17. Thus, relay 17 is energized upon the simultaneous occurrence of the presence of right signals and the absence of left signals.

Control terminal 33 of relay 14 is connected via conductor 34 to contact 35 of relay 7. When relay 7 is energized, in the presence of left signals, contact 35 is connected to terminal 30 of reference source 31 via closed contacts 32 and 35. Control terminal 36 of relay 14 is connected via conductor 37 to contact 38 of relay 10 which, when relay 10 is de-energized in the absence of right signals, is connected to ground via closed contacts 26 and 38. In this way, relay 14 is energized upon the simultaneous occurrence of the presence of the left signal with the absence of the right signal.

Input terminal 19 of voltage comparator 20 is selectively connected to either contact 16 or contact 39 of relay 17 depending upon, respectively, the presence of left signals and the presence of right signals or the absence of left signals and the presence of right signals. Terminal 22 of voltage comparator 20 is selectively connected to contact 13 or contact 40 of relay 14 depending, respectively upon the presence of right signals and the presence of left signals or the absence of right signals and the presence of left signals.

Upon the presence of the right signal and the absence of the left signal, relay 17 is energized and terminal 19 of voltage comparator 20 is connected via closed contacts 18 and 39 to terminal 41 of reference source 31. Reference source 31 produces a voltage output at terminal 41 of such a magnitude, with respect to ground, that when applied to either terminal 19 or terminal 22 of voltage comparator 20, will preferably cause a deflection of differential indicator 48 at least equal to the maximum deflection produced by the direct application to corresponding terminals of comparator 20 of the left and right signal voltages when both are present. Relay 14 remains de-energized in the presence of right signals and the absence of left signals thus maintaining the application of a voltage, for example, a zero voltage, corresponding to the lost left signal, via closed contacts 13 and 21 to terminal 22 of voltage comparator 20.

Relay 14 is energized upon the simultaneous occurrence of the presence of the left signal and the absence of the right signal. In this event, terminal 22 of voltage comparator 20 is connected via closed contacts 21 and 40 of relay 14 to terminal 41 of reference source 31. Zero voltage, corresponding to the lost right signal, continues to be applied to terminal 19 of voltage comparator 20 via closed contacts 18 and 16 of relay 17 inasmuch as relay 17 remains de-energized in the presence of left signals and the absence of right signals.

Assuming that initially right signals are present and left signals are absent and subsequently the remaining right signal is also lost, the operation of relay 17, is as follows. As previously described, relay 17 is energized upon the simultaneous occurrence of the presence of right signals and the absence of left signals thereby connecting control terminal 23 to ground via closed contacts 42 and 43. Terminal 23 is simultaneously connected to ground via conductor 24 and closed contacts 25 and 26 of relay 10 inasmuch as relay 10 is also energized in the presence of right signals. Upon the loss of the remaining right signal, relay 10 is de-energized but relay 17 remains energized via closed holding contacts 42 and 43 which provide a conduction path to maintain the ground connected to terminal 23 despite the interruption of the other path previously completed by contacts 25 and 26 of relay 10 before relay 10 became de-energized.

In the event that left signals are present simultaneously with the absence of the right signals and the remaining left signal is subsequently lost, the operation of relay 14 is as follows. As previously described, relay 14 is energized upon the simultaneous occurrence of the left signal and the absence of the right signal thereby closing contacts 44 and 45 and connecting terminal 30 of reference source 31 to control terminal 33 of relay 14. Control terminal 33 of relay 14 is also connected via conductor 34 and closed contacts 35 and 32 of relay 7 to terminal 30 of reference source 31. Terminals 35 and 32 of relay 7 are closed simultaneously with terminals 44 and 45 of relay 14 inasmuch as relay 7 is also energized in the presence of the left signal. In the event that the remaining left signal is also lost, control terminal 33 of relay 14 remains connected to terminal 30 of reference source 31 via closed holding contacts 45 and 44 which provide a conduction path paralleling the previously available but now disrupted path of conductor 34 and closed contacts 35 and 32 of relay 7 to terminal 30 reference source 31.

The sense of deflection of indicator 48 is inverted when the direction of travel of the guided craft is reversed relative to the direction of propagation of the electromagnetic beam. Proper orientation of the deflection sense may be readily achieved by a simple reversing device such as double-pole double-throw switch 49 which is provided for such purpose at the output of voltage comparator 20.

To summarize briefly the operation of Fig. 2 to produce an indicator deviation characteristic as shown in Fig. 1D, right and left signals are applied respectively to terminals 19 and 22 of voltage comparator 20 when both the right and the left signal are simultaneously present. When the right signal is present and the left signal is absent, then a reference voltage is applied to terminal 19 of voltage comparator 20 while a zero voltage, corresponding to the lost left signal, is applied to terminal 22 thereof. In the alternative event that the right signal is absent simultaneously with the left signal being present then a reference voltage is applied to terminal 22 of voltage comparator 20 while a zero voltage corresponding to the lost right signal is applied to terminal 19 thereof. In the further event that the last remaining left signal is subsequently also lost then the application of the reference voltage to terminal 22 of voltage comparator 20 is maintained. Likewise, where the remaining right signal is subsequently also lost, then the application of the reference voltage to terminal 19 of voltage comparator 20 is maintained.

The indicator deviation characteristic shown in Fig. 1C is obtained simply by the omission of contacts 42 and 43 of relay 17 and the omission of contacts 44 and 45 of relay 14. In the absence of said contacts, neither relay 17 nor relay 14 will be maintained energized upon the loss of the last remaining signal, either right or left, as the case may be.

It is recognized that the present invention in either of its two described modes of operation, is not dependent upon the specific relay configuration described in detail in connection with Fig. 2. As is well known in the relay art, functionally equivalent relay arrangements may be designed, for example, by means of switching algebra analysis.

It also should be noted that this invention is not limited in application to systems producing a prescribed guidance path in the azimuth plane. For example, said prescribed path can also be generated in the elevation plane or in any combination of planes. Of course, the equivalent of one guidance system as shown in Fig. 2, is required for each plane in which a path is to be generated.

Furthermore, the invention is not limited in application to a directional beam system such as was described for illustrative purposes only. Any of the many known systems employing transmitting and radiating means to produce electromagnetic waves which define a prescribed path in space may be used instead. Accordingly, the receiver need only be compatible with the chosen transmitter so that upon detection of the electromagnetic waves first and second voltages are produced having respective amplitudes similarly related to the deviation of the craft from the prescribed path on corresponding sides thereof.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Receiving apparatus including demodulating means discriminatively responsive to first and second mutually distinctive signals and producing first and second voltages each having an amplitude proportional to a predetermined characteristic of a respective one of said signals, a source of reference voltage, a voltage comparator, and coupling means to apply selectively said first and said second voltages and said reference voltage to said voltage comparator, said coupling means comprising a first switching means energized by said first voltage, a second switching means energized by said second voltage, a third switching means responsive to said reference voltage and said first switching means when de-energized and said second switching means when energized, a fourth switching means responsive to said reference voltage and said first switching means when energized and said second switching means when de-energized, said third switching means when de-energized applying said second voltage to a first input of said voltage comparator and applying, when energized, said reference voltage to first input, said fourth switching means when de-energized applying said first voltage to a second input of said voltage comparator and applying, when energized, said reference voltage to said second input, said voltage comparator being responsive to the voltages applied to its first and second inputs to produce a third voltage proportional in amplitude and polarity to the algebraic difference in amplitude therebetween, and an indicator responsive to said third voltage.

2. Coupling apparatus adapted to apply selectively first and second voltages and a reference voltage to a voltage comparator, said apparatus comprising a first switching means energized by said first voltage, a second switching means energized by said second voltage, a third switching means responsive to said reference voltage and said first switching means when de-energized and said second switching means when energized, a fourth switching means responsive to said reference voltage and said first switching means when energized and said second switching means when de-energized, said third switching means when de-energized applying said second voltage to a first input of said voltage comparator and applying, when energized, said reference voltage to said first input, said fourth switching means when de-energized applying said first voltage to a second input of said voltage comparator and applying, when energized, said reference voltage to said second input.

3. Coupling apparatus adapted to apply selectively first and second voltages and first and second reference voltages to a voltage indicator, said apparatus comprising a first switching means energized by said first voltage, a second switching means energized by said second voltage, a third switching means responsive to said first switching means when de-energized and said second switching means when energized, a fourth switching means responsive to said first switching means when energized and said second switching means when de-energized, said third switching means and said fourth switching means when both de-energized applying said first and second voltages to said voltage indicator, said third switching means when energized applying said first reference voltage to said voltage indicator and said fourth switching means when energized applying said second reference voltage to said voltage indicator.

4. Receiving apparatus including demodulating means discriminatively responsive to first and second mutually distinctive signals and producing first and second voltages each having an amplitude proportional to a predetermined characteristic of a respective one of said signals, a source of reference voltage, a voltage comparator, and coupling means to apply selectively said first and said second voltages and said reference voltage to said voltage comparator, said coupling means comprising a first switching means energized by said first voltage, a second switching means energized by said second voltage, a third switching means responsive to said reference voltage and said first switching means when de-energized and said second switching means when energized, a fourth switching means responsive to said reference voltage and said first switching means when energized and said second switching means when de-energized, individual holding means for said third and said fourth switching means to maintain the operating condition thereof when the last remaining energized second and first switching means, respectively, becomes de-energized, said third switching means when de-energized applying said second voltage to a first input of said voltage comparator and applying, when energized, said reference voltage to first input, said fourth switching means when de-energized applying said first voltage to a second input of said voltage comparator and applying, when energized, said reference voltage to said second input, said voltage comparator responsive to the voltages applied to its first and second inputs to produce a third voltage proportional in amplitude and polarity to the algebraic difference in amplitude therebetween, and an indicator responsive to said third voltage.

5. Coupling apparatus adapted to apply selectively first and second voltages and a reference voltage to a voltage comparator, said apparatus comprising a first switching means energized by said first voltage, a second switching means energized by said second voltage, a third switching means responsive to said reference voltage and said first switching means when de-energized and said second switching means when energized, a fourth switching means responsive to said reference voltage and said first switching means when energized and said second switching means when de-energized, individual holding means for said third and said fourth switching means to maintain the operating condition thereof when the last remaining energized second and first switching means, respectively, becomes de-energized, said third switching means when de-energized applying said second voltage to a first input of said voltage comparator and applying, when energized, said reference voltage to said first input, said fourth switching means when de-energized applying said first voltage to a second input of said voltage comparator and applying, when energized, said reference voltage to said second input.

6. Coupling apparatus adapted to apply selectively first and second voltages and first and second reference voltages to a voltage indicator, said apparatus comprising a first switching means energized by said first voltage, a second switching means energized by said second voltage, a third switching means responsive to said first switching means when de-energized and said second switching means when energized, a fourth switching means responsive to said first switching means when energized and said second switching means when de-energized, individual holding means for said third and said fourth switching means to maintain the operating condition thereof when the last remaining energized second and first switching means, respectively, becomes de-energized, said third switching means and said fourth switching means when both de-energized applying said first and second voltages to said voltage indicator, said third switching means when energized applying said first reference voltage to said voltage indicator and said fourth switching means when energized applying said second reference voltage to said voltage indicator.

7. A radio guidance system for a mobile craft comprising a transmitter having radiating means to produce electromagnetic waves which define a prescribed path in space, a receiver responsive to said waves to produce first and second voltages having respective amplitudes similarly related to the deviation of the craft from the path on corresponding sides thereof, a source of reference voltage, a voltage comparator, and means responsive to said first and said second voltages and said reference voltage to apply selectively to said voltage comparator said first and said second voltages when both are present, said second voltage and said reference voltage in lieu of said first voltage when said first voltage is present and said second voltage is absent, said first voltage and said reference voltage in lieu of said second voltage when said first voltage is absent and said second voltage is present, and means for maintaining the application to said voltage comparator of said reference voltage and the one of said first and said second voltages which is absent when the last remaining one of said first and said second voltages subsequently disappears.

8. Receiving apparatus including demodulating means discriminatively responsive to first and second mutually distinctive signals and producing first and second voltages each having an amplitude proportional to a predetermined characteristic of a respective one of said signals, a source of reference voltage, a voltage comparator, and means responsive to said first and said second voltages and said reference voltage to apply selectively to said voltage comparator said first and said second voltages when both are present, said second voltage and said reference voltage in lieu of said first voltage when said first voltage is present and said second voltage is absent, said first voltage and said reference voltage in lieu of said second voltage when said first voltage is absent and said second voltage is present, and means for maintaining the application to said voltage comparator of said reference voltage and the one of said first and said second voltages which is absent when the last remaining one of said first and said second voltages subsequently disappears.

9. Receiving apparatus including demodulating means discriminatively responsive to first and second mutually distinctive signals and producing first and second voltages each having an amplitude proportional to the value of a predetermined characteristic of a respective one of said signals, a comparator adapted to receive said first and second voltages and to produce normally a first output representative of the algebraic difference therebetween, auxiliary means to produce a second output from said comparator related to said first output last obtaining and in lieu thereof, and means responsive to the simultaneous presence of said first and said second voltages to prevent the operation of said auxiliary means.

10. A radio guidance system for a mobile craft comprising a transmitter having radiating means to produce electromagnetic waves which define a prescribed path in space, a receiver responsive to said waves to produce first and second voltages having respective amplitudes similarly related to the deviation of the craft from the path on corresponding sides thereof, a source of reference voltage of predetermined amplitude, switching means having a plurality of input and a pair of output terminals, means for applying said first, second, and reference voltages to respective ones of said input terminals, said switching means being responsive to the amplitudes of said first and second voltages for applying said first and second voltages to respective ones of said output terminals when the amplitudes of both said first and second voltages are above a predetermined level, for applying said first voltage and said reference voltage to respective ones of said output terminals when the amplitude of said first voltage is below said predetermined level and the amplitude of said second voltage is above said predetermined level, and for applying said reference voltage and said second voltage to respective ones of said output terminals when the amplitude of said first voltage is above said predetermined level and the amplitude of said second voltage is below said predetermined level, a voltage comparator connected to said output terminals for producing a third voltage proportional in amplitude and polarity to the algebraic difference between the amplitudes of the voltages appearing at respective ones of said output terminals, and utilization means adapted to receive said third voltage.

11. Receiving apparatus including demodulating means, discriminatively responsive to first and second mutually distinctive signals and producing first and second voltages each having an amplitude related to a predetermined characteristic of a respective one of said signals, a source of reference voltage of predetermined amplitude, switching means having a plurality of input and first and second output terminals, means for applying said first, second, and reference voltages to respective ones of said input terminals, said switching means being responsive to the amplitudes of said first and second voltages for applying said first and second voltages, respectively, to said first and second output terminals when the amplitudes of both said first and second voltages are above a predetermined level, for applying said first voltage and said reference voltage, respectively, to said first and second output terminals when the amplitude of said first voltage is below said predetermined level and the amplitude of said second voltage is above said predetermined level, and for applying said reference voltage and said second voltage, respectively, to said first and second output terminals when the amplitude of said first voltage is above said predetermined level and the amplitude of said second voltage is below said predetermined level, a voltage comparator connected to said output terminals for producing a third voltage proportional in amplitude and polarity to the algebraic difference between the amplitudes of the voltages appearing at respective ones of said output terminals, and utilization means adapted to receive said third voltage.

12. A radio guidance system for a mobile craft comprising a transmitter having radiating means to produce electromagnetic waves which define a prescribed path in space, a receiver responsive to said waves to produce first and second voltages having respective amplitudes similarly related to the deviation of the craft from the path on corresponding sides thereof, a source of reference voltage of predetermined amplitude, switching means having a plurality of input and a pair of output terminals, means for applying said first, second, and reference voltages to respective ones of said input terminals, said switching means being responsive to the amplitudes of said first and second voltages for applying said first and second voltages to respective ones of said output terminals when the amplitudes of both said first and second voltages are above a predetermined level, for applying said first voltage and said reference voltage to respective ones of said output terminals when the amplitude of said first voltage is below said predetermined level and the amplitude of said second voltage is above said predetermined level, and for applying said reference voltage and said second voltage to respective ones of said output terminals when the amplitude of said first voltage is above said predetermined level and the amplitude of said second voltage is below said predetermined level, a voltage comparator connected to said output terminals for producing a third voltage proportional in amplitude and polarity to the algebraic difference between the amplitudes of the voltages appearing at respective ones of said output terminals, means for maintaining the application to said voltage comparator of said reference voltage and the one of said first and second voltages which is below said predetermined level when the amplitude of the last remaining one of said first and second voltages subsequently falls below said predetermined level, and utilization means adapted to receive said third voltage.

13. Receiving apparatus including demodulating means discriminatively responsive to first and second mutually distinctive signals and producing first and second voltages each having an amplitude related to a predetermined characteristic of a respective one of said signals, a source of reference voltage of predetermined amplitude, switching means having a plurality of input and first and second output terminals, means for applying said first, second, and reference voltages to respective ones of said input terminals, said switching means being responsive to the amplitudes of said first and second voltages for applying said first and second voltages, respectively, to said first and second output terminals when the amplitudes of both said first and second voltages are above a predetermined level, for applying said first voltage and said reference voltage, respectively, to said first and second output terminals when the amplitude of said first voltage is below said predetermined level and the amplitude of said second voltage is above said predetermined level, and for applying said reference voltage and said second voltage, respectively, to said first and second output terminals when the amplitude of said first voltage is above said predetermined level and the amplitude of said second voltage is below said predetermined level, a voltage comparator connected to said output terminals for producing a third voltage proportional in amplitude and polarity to the algebraic difference between the amplitudes of the voltages appearing at respective ones of said output terminals, means for maintaining the application to said voltage comparator of said reference voltage and the one of said first and second voltages which is below said predetermined level when the amplitude of the last remaining one of said first and second voltages subsequently falls below said predetermined level, and utilization means adapted to receive said third voltage.

References Cited in the file of this patent

UNITED STATES PATENTS

| Number | Name | Date |
|---|---|---|
| 2,255,741 | Kramar | Sept. 9, 1941 |
| 2,433,351 | Earp | Dec. 30, 1947 |
| 2,586,810 | Frum | Feb. 26, 1952 |
| 2,613,351 | Lang | Oct. 7, 1952 |